US010359498B2

(12) United States Patent
Ikeda (10) Patent No.: US 10,359,498 B2
(45) Date of Patent: Jul. 23, 2019

(54) IMAGE PICKUP APPARATUS HAVING FUNCTION OF GENERATING SIMULATION IMAGE, CONTROL METHOD THEREFOR, AND STORAGE MEDIUM

(71) Applicant: CANON KABUSHIKI KAISHA, Tokyo (JP)

(72) Inventor: Hitoshi Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 15/457,465

(22) Filed: Mar. 13, 2017

(65) Prior Publication Data

US 2017/0269187 A1 Sep. 21, 2017

(30) Foreign Application Priority Data

Mar. 15, 2016 (JP) ................. 2016-051208

(51) Int. Cl.
| | |
|---|---|
| *H04N 9/07* | (2006.01) |
| *G01S 3/786* | (2006.01) |
| *G06T 7/246* | (2017.01) |
| *H04N 5/235* | (2006.01) |
| *H04N 5/217* | (2011.01) |
| *H04N 5/265* | (2006.01) |

(52) U.S. Cl.
CPC ............ *G01S 3/7867* (2013.01); *G06T 7/248* (2017.01); *H04N 5/217* (2013.01); *H04N 5/2353* (2013.01); *H04N 5/265* (2013.01); *H04N 9/07* (2013.01); *G06T 2207/10016* (2013.01); *G06T 2207/10032* (2013.01)

(58) Field of Classification Search
CPC .............. G01S 3/7867; G06T 7/248; G06T 2207/10016; H04N 5/217; H04N 5/2353; H04N 5/265; H04N 9/07; G09B 9/36
See application file for complete search history.

(56) References Cited

U.S. PATENT DOCUMENTS

| | | | | |
|---|---|---|---|---|
| 5,991,428 A * | 11/1999 | Taniguchi | ............ | G06K 9/3241 348/155 |
| 6,040,865 A * | 3/2000 | Kato | .................. | H04N 19/61 348/699 |
| 6,366,317 B1 * | 4/2002 | Mattison | ........... | H01L 27/14643 257/E27.133 |

(Continued)

FOREIGN PATENT DOCUMENTS

| | | |
|---|---|---|
| JP | 2012-004763 A | 1/2012 |
| JP | 2015-035717 A | 2/2015 |

*Primary Examiner* — Fernando Alcon
(74) *Attorney, Agent, or Firm* — Cowan, Liebowitz & Latman, P.C.

(57) ABSTRACT

An image pickup apparatus capable of generating a high-quality trail simulation image with little noise, without degrading usability. An image pickup unit shoots a first image, a black image, and a second image in this order. A noise reduction unit executes a process for reducing noise in at least one image of the first image and the second image using the black image. A trail generation unit generates a predicted trail of an object on the basis of a movement of the object between the first image and the second image. A synthesis unit synthesizes the first image or the second image in which the noise has been reduced and the generated trail and generates a trail simulation image of the object. A display unit displays the synthesized trail simulation image.

7 Claims, 6 Drawing Sheets

(56) References Cited

U.S. PATENT DOCUMENTS

| | | | | |
|---|---|---|---|---|
| 6,665,342 | B1* | 12/2003 | Brown | G08B 13/19602 348/E5.054 |
| 9,918,022 | B2* | 3/2018 | Aota | H04N 5/2625 |
| 9,936,144 | B2* | 4/2018 | Hatakeyama | H04N 5/23229 |
| 2003/0112473 | A1* | 6/2003 | Robins | H04N 5/361 358/463 |
| 2005/0018253 | A1* | 1/2005 | Takeda | H04N 1/2112 358/474 |
| 2010/0271495 | A1* | 10/2010 | Tamura | G06T 5/003 348/208.4 |
| 2011/0293139 | A1* | 12/2011 | Ohta | G01S 3/7867 382/103 |
| 2012/0106869 | A1* | 5/2012 | Machitani | H04N 5/23254 382/284 |
| 2014/0313367 | A1* | 10/2014 | Iwasaki | H04N 5/2351 348/222.1 |
| 2015/0377999 | A1* | 12/2015 | Shen | H04N 5/232 348/144 |
| 2016/0191820 | A1* | 6/2016 | Iwasaki | H04N 5/23232 348/169 |
| 2017/0054921 | A1* | 2/2017 | Lu | H04N 5/2621 |
| 2018/0234608 | A1* | 8/2018 | Sudo | H04N 5/23219 |

* cited by examiner

FIRST SIMULATION IMAGE

FIG. 4B

STAR REGION DETECTION, MOVEMENT VECTOR CALCULATION RESULT

FIG. 4C

MOVEMENT PREDICTION POINT CALCULATION RESULT

FIG. 4D

TRAIL IMAGE GENERATION RESULT

IMAGE PICKUP APPARATUS HAVING FUNCTION OF GENERATING SIMULATION IMAGE, CONTROL METHOD THEREFOR, AND STORAGE MEDIUM

BACKGROUND OF THE INVENTION

Field of the Invention

The present invention relates to an image pickup apparatus having a function of generating a simulation image of, for example, trails of stars, a control method therefor, and a storage medium.

Description of the Related Art

Apparatuses such as compact digital cameras mounted with shooting modes such as a mode in which a star-filled night sky is shot, a mode in which a starry sky and persons are finely shot, and a mode in which diurnal motions of stars are shot as trails to enable easy shooting of the starry sky are sold commercially. Here, when the diurnal motions of the stars are shot as the trails, generally, shooting is repetitively performed under long-time exposure, and the lighten composition of shot frame images is performed. However, the diurnal motions of the stars are very slow, long-time shooting is necessary to shoot the diurnal motions of the stars as the trails, and a user (photographer) does not often know what kinds of trails are shot until shooting is completed. For this reason, determination of a composition before shooting is not easy. Therefore, an image pickup apparatus that predicts positions of heavenly bodies after passage of any time by calculating a position relation of a direction of the image pickup apparatus and the heavenly bodies using information of a GPS sensor and an elevation angle sensor and performs superposition display on a live view image is suggested (refer to Japanese Laid-Open Patent Publication (kokai) No. 2012-4763).

Meanwhile, in a digital camera, an increase in a temperature of an image pickup device due to long-time exposure causes fixed pattern noise such as defects and dark shading to occur. As a result, an image quality may be degraded. In shooting of the trails of the diurnal motions of the stars, because it is necessary to continuously perform shooting under the long-time exposure for a long time, conditions where the fixed pattern noise is easy to occur are met. Therefore, technology for enabling generation of a high-quality image with little fixed pattern noise, even when shooting is repetitively performed under the long-time exposure, is suggested (refer to Japanese Laid-Open Patent Publication (kokai) No. 2015-35717). In the image pickup apparatus described in Japanese Laid-Open Patent Publication (kokai) No. 2015-35717, a black image (light shielding image) is shot individually before and after actual shooting and a noise reduction process is executed using the shot black images.

However, in the image pickup apparatus described in Japanese Laid-Open Patent Publication (kokai) No. 2012-4763, because the GPS sensor, the elevation angle sensor and the like are necessary, a size of the image pickup apparatus may increase and a product cost may increase as well. In addition, in the image pickup apparatus described in Japanese Laid-Open Patent Publication (kokai) No. 2012-4763, only the positions of the heavenly bodies after passage of any time can be displayed and it is impossible to know how the trails of the heavenly bodies are shot. For this problem, a countermeasure to detect the heavenly bodies (such as stars) on the basis of a plurality of image data and generate a simulation image (hereinafter, referred to as a "trail simulation image") of trails of the detected heavenly bodies is considered. According to this method, predicted trails of the stars after completion of shooting can be known by only the image pickup apparatus, without using a special external apparatus.

However, when the noise reduction process as described in Japanese Laid-Open Patent Publication (kokai) No. 2015-35717 is further executed to suppress the image quality from being degraded due to the fixed pattern noise, shooting of the black image needs to be performed in addition to shooting of images used for an computation to predict the movements of the stars. In this case, a long time is necessary to generate the trail simulation image, which results in degrading usability.

SUMMARY OF THE INVENTION

The present invention provides an image pickup apparatus capable of generating a high-quality trail simulation image with little noise, without degrading usability, a control method therefor, and a storage medium.

Accordingly, the present invention provides an image pickup apparatus, comprising an image pickup unit configured to shoot a first image, a black image, and a second image in this order, a noise reduction unit configured to execute a process for reducing noise in at least one image of the first image and the second image using the black image, a trail generation unit configured to generate a predicted trail of an object, on the basis of a movement of the object between the first image and the second image, a synthesis unit configured to synthesize the first image or the second image in which the noise has been reduced by the noise reduction unit and the trail generated by the trail generation unit and generate a trail simulation image of the object, and a display unit configured to display the trail simulation image synthesized by the synthesis unit.

According to the present invention, a high-quality trail simulation image with little noise can be generated without degrading usability.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof. Here, an apparatus generally called a compact digital camera is taken as an image pickup apparatus according to the present invention. However, the image pickup apparatus according to the present invention is not limited thereto and may be a digital single-lens reflex camera or a digital video camera capable of shooting a still image, for example.

Figure 1A:
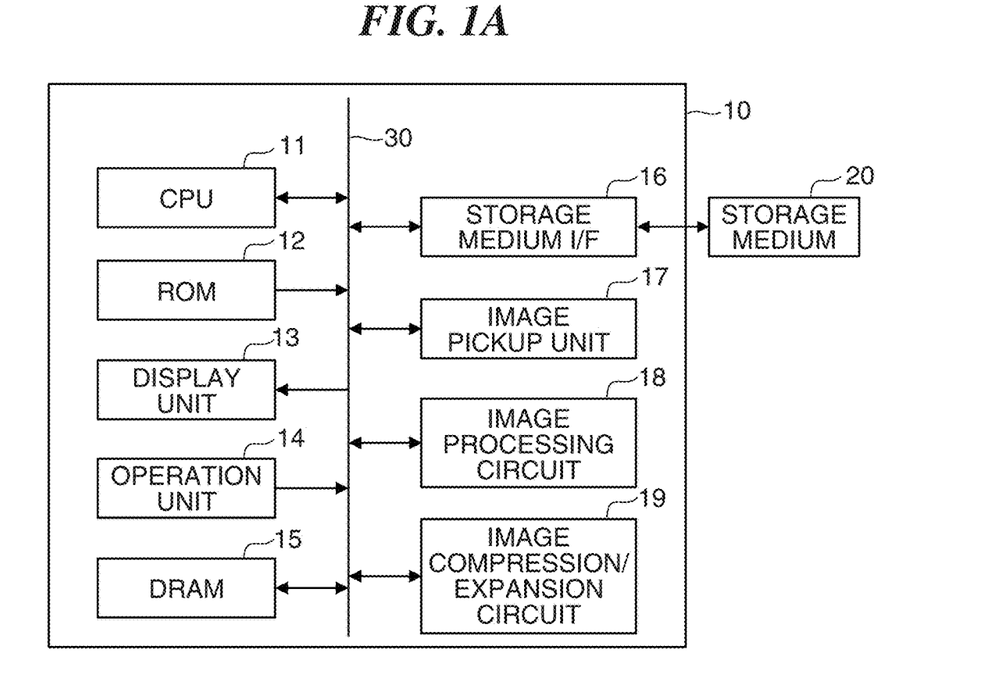
FIG. 1A is a block diagram showing a schematic configuration of an image pickup apparatus according to an embodiment of the present invention and FIG. 1B is a perspective view when viewing the image pickup apparatus of FIG. 1A from a back surface side.
Figure 1B:
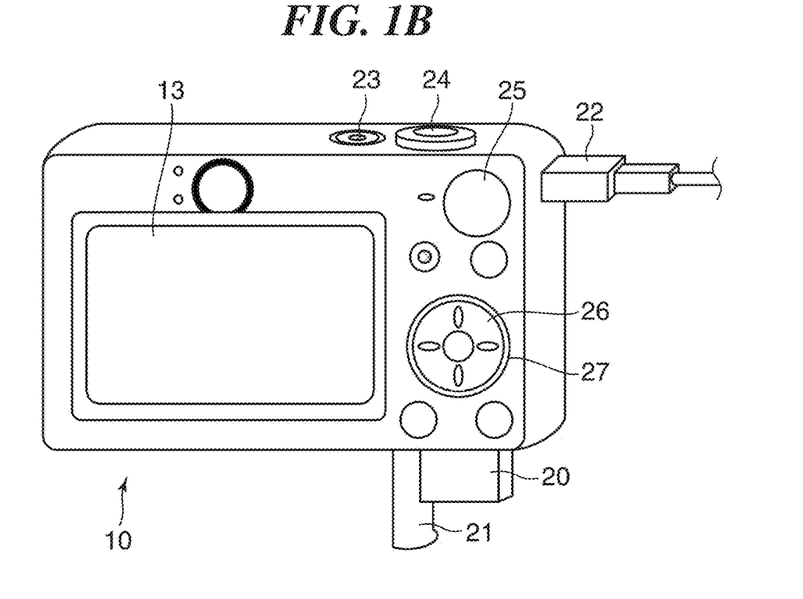

FIG. 1A is a block diagram showing a schematic configuration of an image pickup apparatus 10 according to an embodiment of the present invention. FIG. 1B is a perspective view when viewing the image pickup apparatus 10 in FIG. 1A from a back surface side. The image pickup apparatus 10 includes a CPU 11, a ROM 12, a display unit 13, an operation unit 14, a DRAM 15, a storage medium I/F 16, an image pickup unit 17, an image processing circuit 18, and an image compression/expansion circuit 19 and these elements are connected to enable communication via an internal bus 30.

The CPU 11 is a central processing unit that controls operations of the individual units configuring the image pickup apparatus 10 to control whole operations of the image pickup apparatus 10, according to an instruction received by the operation unit 14. Various programs (firmware and software) executed by the CPU 11 to control the image pickup apparatus 10 or information (data) such as parameters necessary for executing the various programs are stored in the ROM 12.

The display unit 13 is a color liquid crystal display, for example, and is used as a GUI to display various information of the image pickup apparatus 10 and perform setting of functions of the image pickup apparatus 10, in addition to displaying an object at the time of shooting or a shot image. In addition, the display unit 13 includes a terminal (not shown in the drawings) to output a video signal to an external device, and a connector cable 22 is connected to the terminal (not shown in the drawings), so that data communication between the CPU 11 and the external device is enabled. The operation unit 14 includes a power button 23, a release button 24, a mode dial 25, a cross key 26, a controller wheel 27 and the like and receives an operation from a user (photographer). A starry sky trail mode to be described below can be selected and set by an operation of the mode dial 25.

The DRAM 15 is used as a work area of the CPU 11 and temporarily stores various data such as image data, data for display, and data after image compression. Although not shown in the drawings, writing data to the DRAM 15 or reading data from the DRAM 15 is performed through a memory controller (not shown in the drawings). In addition, in the image pickup apparatus 10, a DMA controller (not shown in the drawings) to perform DMA transfer not through reading/writing by the CPU 11 is provided between the DRAM 15 and other units.

The image pickup apparatus 10 has a storage medium slot not shown in the drawings. The storage medium slot is opened/closed freely by a lid 21 and a storage medium 20 such as a memory card (semiconductor memory such as a flash memory) can attached to or detached from the storage medium slot. The storage medium I/F 16 is an interface to enable communication between the storage medium 20 mounted in the storage medium slot and the CPU 11 and the like. The image pickup unit 17 has a lens, a diaphragm, a shutter, an image pickup device such as a CCD sensor and a CMOS sensor, and an A/D converter. Photoelectric conversion is executed on an optical image formed on the image pickup device by the image pickup device. As a result, a generated analog signal is converted into image data, which is composed of a digital signal by the A/D converter, is output to the DRAM 15, and is output from the DRAM 15 to, for example, the image processing circuit 18.

The image processing circuit 18 executes various processes such as white balance adjustment (hereinafter, referred to as "WB adjustment") and pixel interpolation on image data read from the image pickup unit 17. In addition, the image processing circuit 18 performs conversion of the image data into YUV data, a resizing process for changing a size of the image data to any size, generation of image data for display to be displayed on the display unit 13, and generation of image data for compression to be compressed by the image compression/expansion circuit 19. In addition, the image processing circuit 18 executes a lighten composite process to generate an image (hereinafter, referred to as a "starry sky image") in which trails of bright spots such as stars are shot or a noise reduction process of fixed pattern noise such as defects and dark shading at the time of generating the starry sky image. In addition, the image processing circuit 18 generates a trail simulation image (simulation image of the trails of the bright spots such as the stars). The image compression/expansion circuit 19 compresses the YUV data into image data of a JPEG format or an H.264 format, or, conversely, the image compression/expansion circuit 19 expands the compressed image data into data of an original size.

The image pickup apparatus 10 is configured to operate in a shooting mode in which lighten composition of a plurality of still images continuously shot is performed to generate and store an image of movement trails of bright spots by operating the mode dial 25. As a typical example of the movement trails of the bright spots, there are trails of diurnal motions of the stars. Therefore, in the present embodiment, the shooting mode in which the shooting image of the movement trails of the bright spots is generated and stored is hereinafter called a "starry sky trail mode". At the time of shooting in the starry sky trail mode, a black image subtraction process is executed at predetermined timing and a trail simulation process can be executed according to an operation of the user for the operation unit 14. Here, the trail simulation process is a process for detecting the bright spots of the stars from a plurality of images before actual shooting (actual shooting of the starry sky image), generating a prediction image of trails of the detected bright spots, and displaying the prediction image on the display unit 13. In addition, the black image subtraction process is a noise reduction process for reducing fixed pattern noise, which is easy to occur by long-time exposure, using a black image and generating a high-quality image, in the present embodiment.

Figure 2:
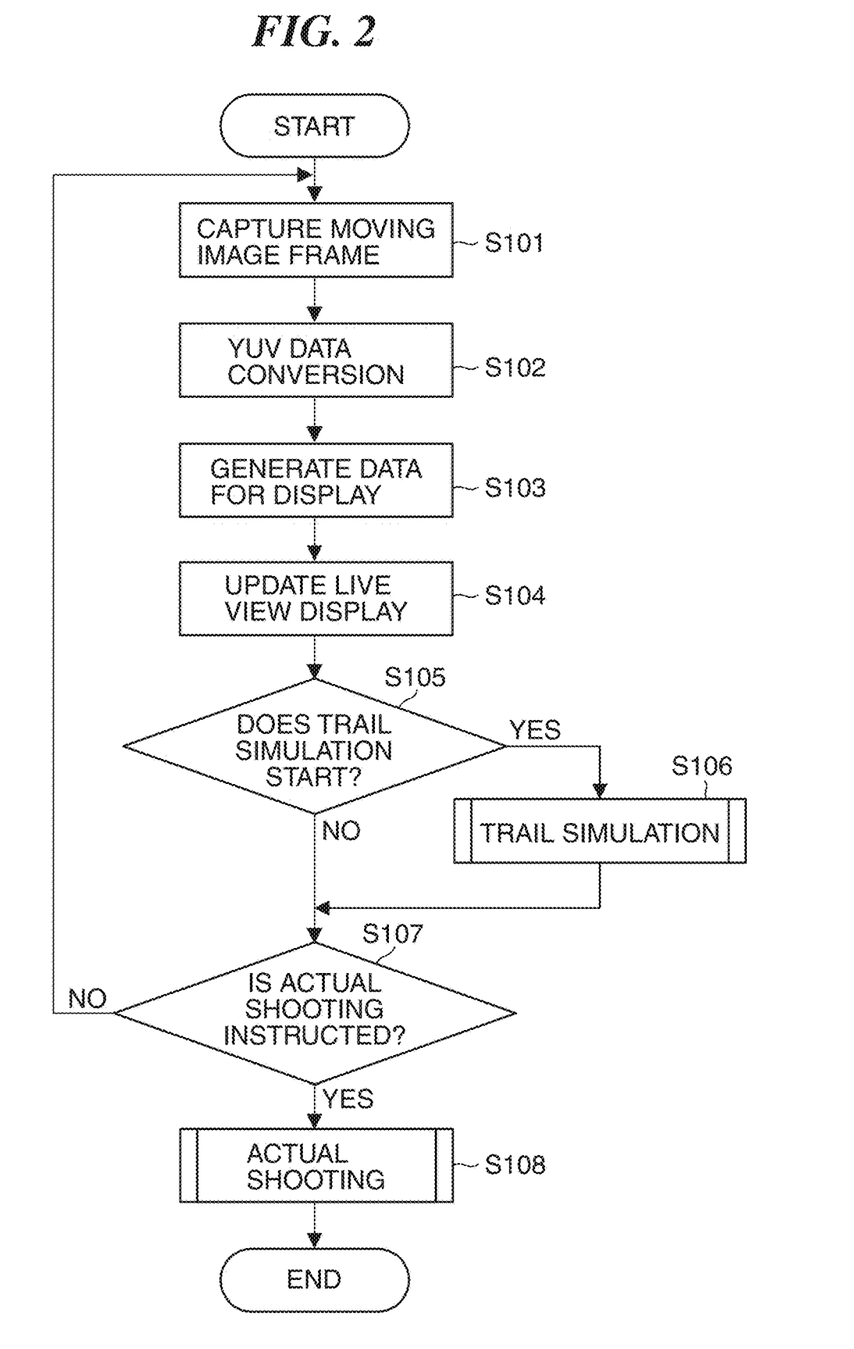
FIG. 2 is a flowchart showing an operation of the image pickup apparatus in FIGS. 1A and 1B in a starry sky trail mode.

FIG. 2 is a flowchart showing an operation of the image pickup apparatus 10 in the starry sky trail mode. Here, in a shooting scene in which the stars can be confirmed with naked eyes, the trails of the diurnal motions of the stars are shot. Each process shown in the flowchart in FIG. 2 is realized by the CPU 11 developing a predetermined program stored in the ROM in a work area of the DRAM 15 and operating each unit of the image pickup apparatus 10 in a coordinated manner.

In step S101, the CPU 11 captures an image picked up by the image pickup unit 17 for live view display as a moving image frame. In step S102, the CPU 11 executes a process such as WB adjustment and pixel interpolation on image data of the captured moving image frame by the image processing circuit 18, converts the image data into YUV data, and writes the YUV data to the DRAM 15. In step S103, the CPU 11 executes a process such as a resizing process for changing a size of the YUV data to a size of image data for display on the YUV data and generates image data for display to perform live view display on the display unit 13 by the image processing circuit 18, and writes the image data for the display to the DRAM 15. In step S104, the CPU 11 displays the image data for the display on the display unit 13. As a result, a live view display image on the display unit 13 is updated.

In step S105, the CPU 11 determines whether an instruction to start the trail simulation process is received through the operation unit 14. It should be noted that the trail simulation process is started when the user operates a predetermined button included in the operation unit 14 or executes a touch operation on the color liquid crystal display of the display unit 13. When the start of the trail simulation process is instructed (YES in the S105), the CPU 11 causes the process to proceed to step S106, and when the start of the trail simulation process is not instructed (NO in S105), the CPU 11 causes the process to proceed to step S107. In the step S106, the CPU 11 executes the trail simulation process. The details of the trail simulation process in the step S106 will be described later.

In the step S107, the CPU 11 determines whether start of the actual shooting (shooting of the starry sky image) is instructed. It should be noted that the actual shooting is started when the user presses the release button 24 or executes a touch operation on the color liquid crystal display of the display unit 13. When the instruction to start the actual shooting is received (YES in the S107), the CPU 11 causes the process to proceed to step S108, and when the instruction to start the actual shooting is not received (NO in the S107), the CPU 11 causes the process to return to step S101. In step the S108, the CPU 11 executes the actual shooting process. It should be noted that the details of the actual shooting process in the step S108 will be described later. When the actual shooting process in the step S108 ends, the present flow ends.

Figure 3:
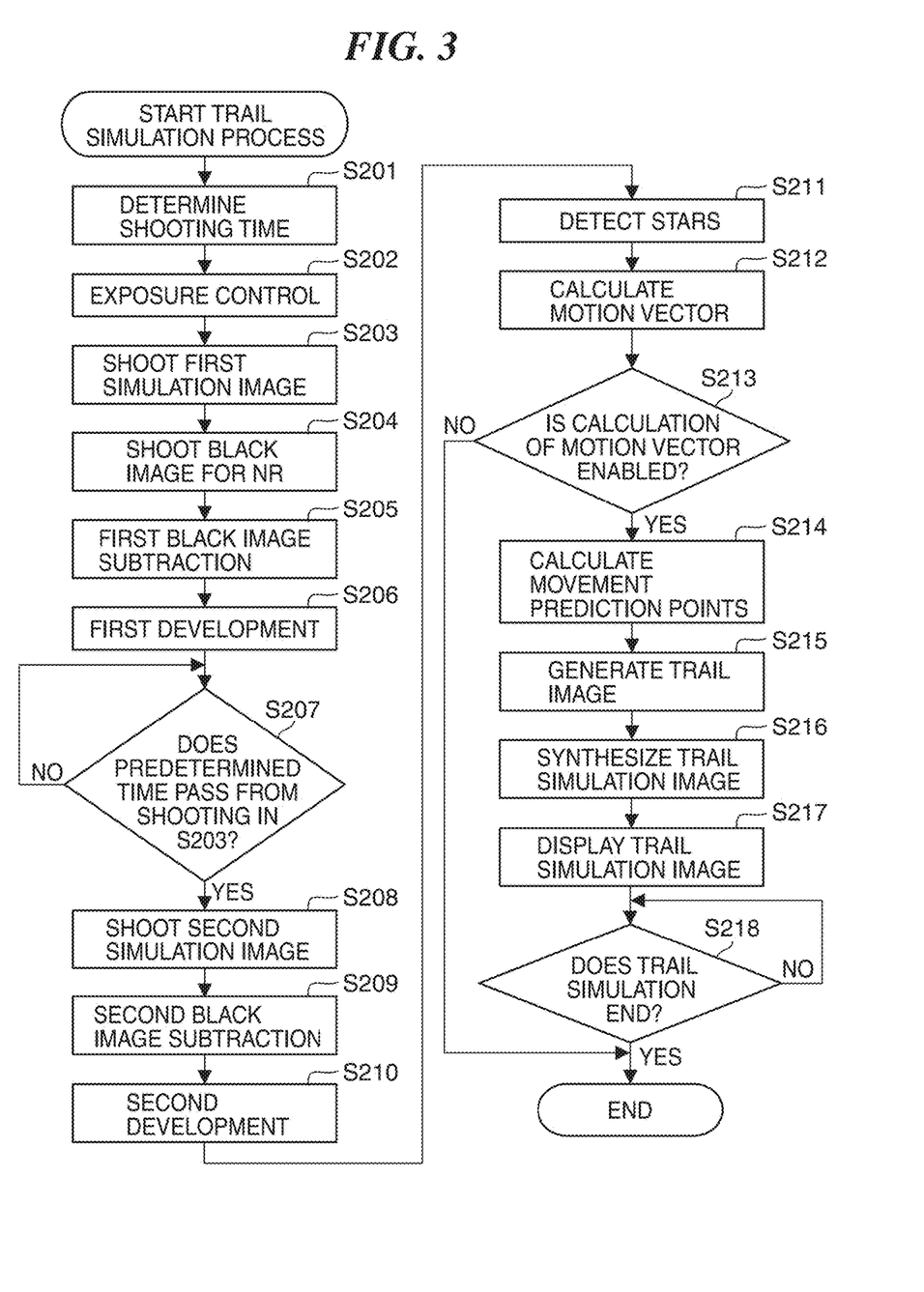
FIG. 3 is a flowchart of a trail simulation process in step S106.

Next, the trail simulation process in the step S106 will be described in detail. FIG. 3 is a flowchart of the trail simulation process in the step S106. FIGS. 4A to 4D are diagrams showing a trail generation process in the trail simulation process.

First, in step S201, the CPU 11 sets a shooting time instructed by the user operating the operation unit 14. In the trail simulation process, a trail simulation image in which trails of stars when a starry sky is shot by the shooting time set in the step S201 are simulated and expressed is generated. The user may set a long shooting time when the user desires to shoot long trails of the stars and may set a short shooting time when the user desires to shoot short trails of the stars. In step S202, the CPU 11 calculates exposure conditions in the actual shooting and sets the diaphragm of the image pickup unit 17, an exposure time, and ISO sensitivity such that exposure conditions become equal to the calculated exposure conditions.

In step S203, the CPU 11 shoots a first simulation image (first image) by the image pickup unit 17 under the exposure conditions set in the step S202 and writes image data thereof to the DRAM 15. In step S204, the CPU 11 closes the shutter of the image pickup unit 17 to enter a light shielding state and shoots a black image for noise reduction (hereinafter, referred to as the "black image for NR") by the image pickup unit 17, on the basis of the exposure time and the ISO sensitivity set in the step S202. The CPU 11 then writes image data of the shot black image for the NR to the DRAM 15. It should be noted that in subsequent step S208, a second simulation image is shot. Therefore, the black image for the NR is shot during shooting of the two simulation images. As a result, as compared with a case in which the black image for the NR is shot before or after shooting the two simulation images, a time necessary for generating the trail simulation image can be avoided from increasing by a time necessary for shooting the black image for the NR.

In step S205, the CPU 11 executes the black image subtraction process on the first simulation image shot in the step S203, using the black image for the NR shot in the step S204, by the image processing circuit 18. It should be noted that here, the black image subtraction process is a process for reducing fixed pattern noise due to the image pickup device by subtracting the black image for the NR from the first simulation image. In step S206, the CPU 11 executes a development process (such as the WB adjustment and the pixel interpolation) on the first simulation image subjected to the black image subtraction process in the step S205 and converts image data into YUV data using the image processing circuit 18, and writes the YUV data to the DRAM 15.

In step S207, the CPU 11 determines whether a predetermined time passes from shooting of the first simulation image in the step S203. The predetermined time to be a determination reference in the step S207 is set such that a motion vector suitable for calculating movement prediction points of the stars in subsequent step S214 is obtained in subsequent step S212. The CPU 11 repeats the determination in the step S207 until the predetermined time passes (NO in the S207). When the predetermined time passes (YES in the S207), the CPU 11 causes the process to proceed to the step S208.

In the step S208, the CPU 11 shoots a second simulation image (second image) by the image pickup unit 17 under the exposure conditions set in the step S202 and writes image data thereof to the DRAM 15. In step S209, the CPU 11 executes the black image subtraction process on the second simulation image shot in the step S208, using the black image for the NR shot in the step S204, by the image processing circuit 18. In step S210, the CPU 11 executes the development process (such as the WB adjustment and the pixel interpolation) on the second simulation image subjected to the black image subtraction process in the step S209 and converts image data into YUV data using the image processing circuit 18, and writes the YUV data to the DRAM 15.

Figure 4A:
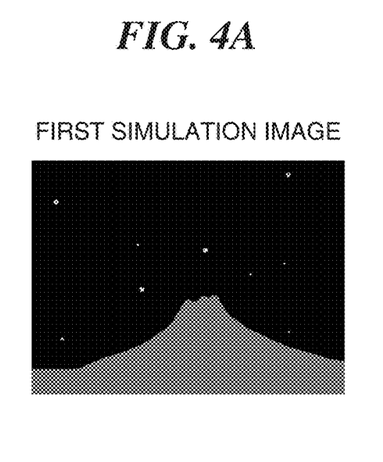
FIGS. 4A to 4D are diagrams showing a trail generation process in the step S106.
Figure 4B:
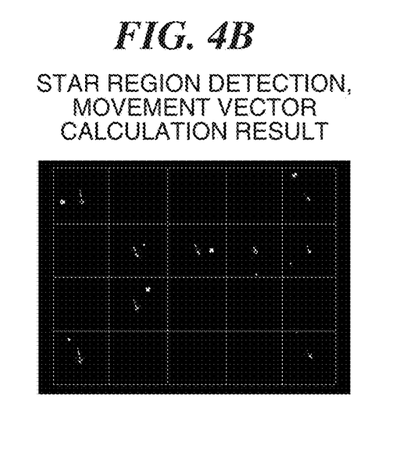

In step S211, the CPU 11 detects star regions from the first simulation image developed (subjected to the black image subtraction process) in the step S206, using the image processing circuit 18. FIG. 4A is a diagram showing the first simulation image, and FIG. 4B is a diagram showing a detection result of the star regions detected from the first simulation image. A method of detecting the star regions is not particularly limited. For example, high luminance regions (bright spots) of a predetermined threshold or more are extracted and matching with a unique template previously held in the ROM is performed to detect isolated points (star regions) in an image. Next, for all the detected star regions, the center coordinates thereof, color information of center coordinates, and areas and average luminance of the star regions are calculated.

In step S212, the CPU 11 calculates motion vectors from the two simulation images developed in the steps S206 and S210, using the image processing circuit 18. In FIG. 4B, an example of a calculation result of the motion vectors is shown. In the step S212, the CPU 11 first divides an image into a plurality of blocks (regions) and performs template matching for each block to detect a motion vector of each block. At this time, the motion vectors may be detected by limiting the blocks in such a way that blocks in which isolated points of a predetermined number or more are detected in the step S211 may be set as the star regions. Next, the CPU 11 calculates a motion vector of an entire image between the two images, on the basis of the motion vector for each of the detected blocks.

In the present embodiment, the movement of the entire image is represented by an affine coefficient. In this case, if the first image is set as a reference image and the second image is set as a target image, coordinates (x, y) of a pixel of interest in the reference image and coordinates (x', y') of the pixel of interest in the target image can be represented by the following mathematical expression 1 using an affine coefficient (a, b, c, d) in affine transformation. Therefore, the affine coefficient is calculated using three or more motion vectors among the detected motion vectors of the individual blocks and an error E of the motion vectors is acquired by the following mathematical expression 2. In addition, processes are performed by changing a pattern of a method of selecting the motion vectors a predetermined number of times, and an affine coefficient in which the number of motion vectors becoming the error E or less is largest is acquired.

[Mathematical expression]
$$\begin{bmatrix} x' \\ y' \end{bmatrix} = \begin{bmatrix} a & b \\ -b & a \end{bmatrix} \begin{bmatrix} x \\ y \end{bmatrix} + \begin{bmatrix} c \\ d \end{bmatrix}$$

[Mathematical expression 2]
$$E = \sum_i (ax_i + by_i + c - x'_i)^2 + \sum_i (-bx_i + ay_i + d - y'_i)^2$$

In step S213, the CPU 11 determines whether calculation of the motion vector is enabled. Specifically, when a maximum value of the number of motion vectors becoming the error E or less is smaller than a predetermined number, calculation of the affine coefficient is disabled. For this reason, it is determined that the calculation of the motion vector is disabled. When the calculation of the motion vector is disabled (NO in the S213), the CPU 11 ends the trail simulation process, and when the calculation of the motion vector is enabled (YES in the S213), the CPU 11 causes the process to proceed to step S214.

Figure 4C:
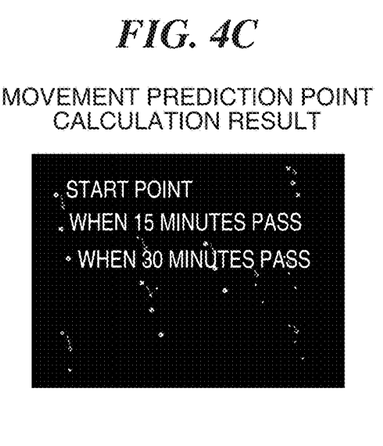

In the step S214, the CPU 11 calculates movement prediction points of the stars until the shooting time set in the step S201, on the basis of the motion vector (affine coefficient) calculated in the step S212. FIG. 4C is a diagram showing an example of a calculation result of the movement prediction points. The movement prediction points of the stars can be calculated, for example, as follows. First, an affine coefficient (for example, an affine coefficient per minute) per unit time is calculated on the basis of the affine coefficient calculated in the step S212 and a difference of exposure start times when the first and second simulation images are shot, respectively. Next, an affine coefficient per time interval (hereinafter, referred to as "prediction point calculation interval") to calculate the prediction points is calculated by correcting a previously acquired affine coefficient per unit time. In the following description, it is assumed that the prediction point calculation interval is 15 minutes. For each of the center coordinates of the stars detected in the step S211, affine transformation is performed on the basis of the corrected affine coefficient, so that movement prediction points after passage of 15 minutes can be calculated. For the calculated movement prediction points after passage of 15 minutes, the affine transformation is performed on the basis of the corrected affine coefficient, so that movement prediction points after passage of 30 minutes can be calculated. These processes are repeated, so that one or more movement prediction points per prediction point calculation interval can be calculated. The calculation of the movement prediction points ends at the shooting time set in the step S201.

Figure 4D:
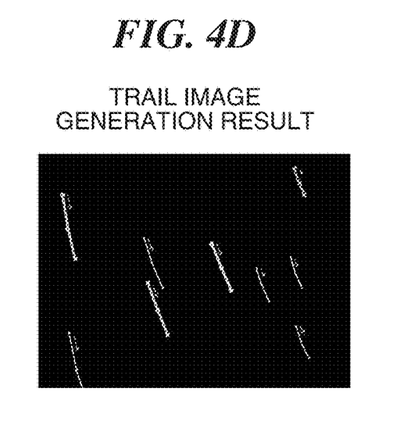

In step S215, the CPU 11 generates a trail image, on the basis of the movement prediction points acquired in the step S214. FIG. 4D is a diagram showing an example of a generation result of the trail image. In the generation process of the trail image, first, a background portion is painted with black. Next, lines are drawn to connect the center coordinates of the stars detected in the step S211 and the movement prediction points per prediction point calculation interval calculated in the step S214 with respect to the shooting time set in the step S201, so that the trails of the stars are generated. Therefore, the trail image becomes an image in which only the predicted movements of the stars are expressed as lines.

At this time, properties of the lines drawn as the trails of the stars are adjusted according to parameters showing features of the star regions (isolated points) detected in the step S211. A first parameter is an area of the star region, and the thickness of the line is changed according to the area of the star region. If the star region is large, the trail is drawn by the thick line and when the star region is small, the trail is drawn by the thin line. A second parameter is luminance of the star region, and luminance of the line drawn as the trail is adjusted according to average luminance of the star region. A third parameter is a color of the star region and a color of the line drawn as the trail is changed according to a color component of the center coordinates of the star region. When the trail of the star is drawn as the line, at least one parameter may be considered without considering all the parameters.

Figure 5:
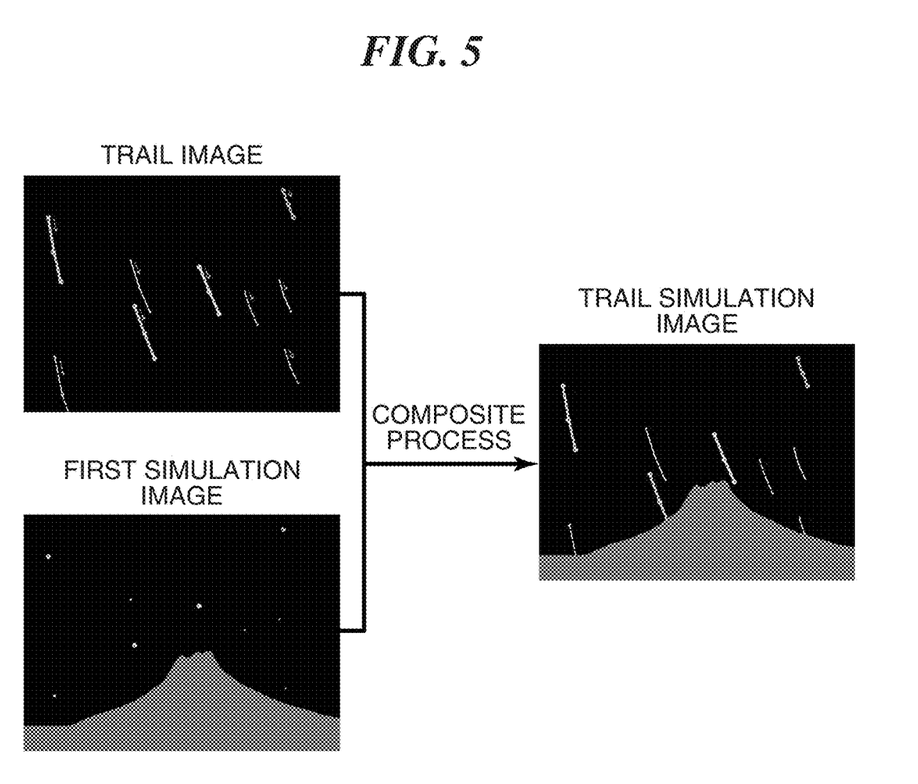
FIG. 5 is a diagram showing a trail simulation image generation process in the step S106.

In step S216, the CPU 11 performs lighten composition of the trail image generated in the step S215 and the first simulation image developed in the step S206 and generates a trail simulation image, using the image processing circuit 18. FIG. 5 is a diagram showing a generation process of the trail simulation image in the step S216. The trail image shown in FIG. 5 is the same as the image shown in FIG. 4D and the first simulation image is the same as the image shown in FIG. 4A. The lighten composition of these images is performed, so that the trail simulation image is generated. At this time, a foreground region (in the present embodiment, a region of a mountain of a lower side of the image) is detected and image composition is not performed in the detected foreground region.

The detection of the foreground region is performed, for example, as follows. First, an image is reduced, adjacent pixels having similar luminance values or color information are grouped to perform region division, and an average luminance value of each region is calculated. Next, with respect to average luminance of a region (comparison source) including a lot of star regions detected in the step S211 among the grouped regions average luminance of the other region (comparison destination) is compared. When a difference of average luminance values is a predetermined threshold or more, it is determined that the region of the comparison destination is the foreground region. As a result, an unnatural trail simulation image in which the stars flow into the foreground region can be prevented from being generated.

In step S217, the CPU 11 displays the trail simulation image generated in the step S216 on the display unit 13. In step S218, the CPU 11 determines whether the operation unit 14 receives an instruction to end the trail simulation process. The CPU 11 maintains a waiting state until the instruction to end the trail simulation process is received (NO in the S218). When the instruction to end the trail simulation process is received (YES in the S218), the CPU 11 ends the trail simulation process.

It should be noted that a part of the series of processes described with reference to FIG. 3 can be changed. For example, in the process in the step S211, the first simulation image subjected to the black image subtraction process is preferably used. However, the first simulation image shot in the step S203 and not subjected to the black image subtraction process may be used instead. In the step S212, the first and second simulation images subjected to the black image subtraction process are preferably used. However, the first and second simulation images shot in the steps S203 and S208 and not subjected to the black image subtraction process may be used instead. In the step S216, the trail simulation image may be generated by performing the lighten composition of the trail image generated in the step S215 and the second simulation image developed in the step S210 and subjected to the black image subtraction process. Each of the generation process (the steps S205 and S206) of the first simulation image subjected to the black image subtraction process and the generation process (the steps S209 and S210) of the second simulation image subjected to the black image subtraction process can be omitted when each of these images are not used in a process of a subsequent step. In the step S212, the movements of the stars are predicted by calculating the motion vectors from the two simulation images. However, the method of predicting the movements of the stars is not limited thereto and a variety of known methods may be used.

Figure 6:
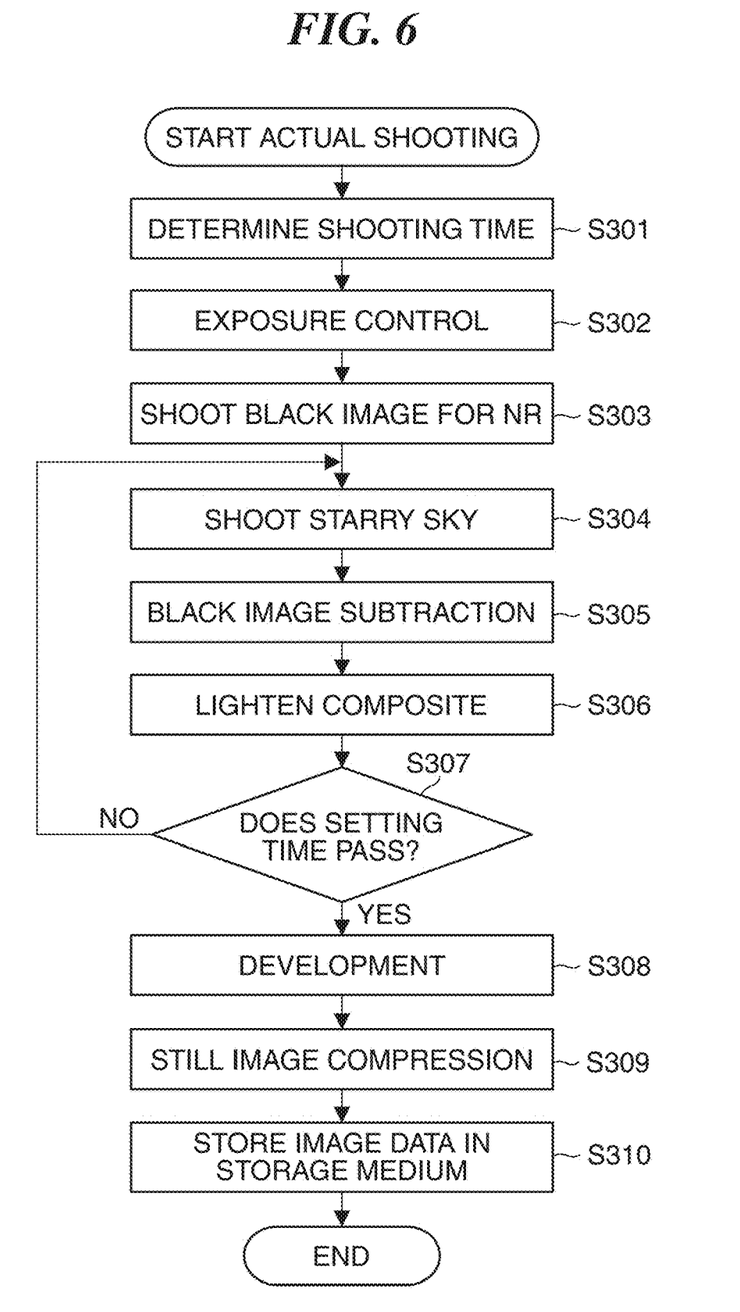
FIG. 6 is a flowchart of an actual shooting process in step S108.

Next, the actual shooting process in the step S108 will be described in detail. FIG. 6 is a flowchart of the actual shooting process in the step S108. In step S301, the CPU 11 sets a shooting time instructed by the user. Here, when the step S106 is executed, the shooting time set in the step S201 may be automatically set. In step S302, the CPU 11 calculates exposure conditions and sets the diaphragm, the exposure time and the ISO sensitivity of the image pickup unit 17. Here, when the step S106 is executed, the exposure conditions set in the step S202 may be automatically set.

In step S303, the CPU 11 closes the shutter of the image pickup unit 17 to enter a light shielding state, shoots the black image for the NR by the image pickup unit 17, on the basis of the exposure time and the ISO sensitivity set in the step S302, and writes image data thereof to the DRAM 15. In the actual shooting, a plurality of images is continuously shot. However, shooting of the black image for the NR is performed before shooting of the object, so that the trails of the stars can be prevented from being interrupted by the shooting interval.

In steps S304 to S307, the starry sky is repetitively shot under long-time exposure, and the lighten composition of shot frame images is performed. That is, in step S304, the CPU 11 shoots the starry sky to be the object, on the basis of the exposure conditions set in the step S302, and writes image data thereof to the DRAM 15. In step S305, the CPU 11 executes the black image subtraction process on the image shot in the step S304, using the black image for the NR shot in the step S303, using the image processing circuit 18. In step S306, when it is assumed that an n-th process is executed at the present time, the CPU 11 executes the lighten composition of an n-th image subjected to the black image subtraction process in the step S305 with respect to a (n−1)-th composite image, to generate an n-th composite image using the image processing circuit 18. In step S307, the CPU 11 determines whether the shooting time set in the step S301 passes. When the shooting time does not pass (NO in the step S307), the CPU 11 causes the process to return to the step S304. As a result, a (n+1)-th process is executed. Meanwhile, when the shooting time passes (YES in the step S307), the CPU 11 causes the process to proceed to step S308.

In the step S308, the CPU 11 executes the development process (the WB adjustment or the pixel interpolation) on the composite image generated in the step S306 temporally close to the step S308, converts image data into YUV data, and generates image data of the starry sky image using the image processing circuit 18. The CPU 11 writes the generated image data of the starry sky image to the DRAM 15. In step S309, the CPU 11 executes compression coding of the image data of the starry sky image written to the DRAM 15 in the step S308 into still image data of a JPEG format, using the image compression/expansion circuit 19, and writes the still image data to the DRAM 15. In step S310, the CPU 11 stores the still image data written to the DRAM 15 in the step S309 in the storage medium 20 via the storage medium I/F 16. Thereby, the actual shooting process ends.

As described above, in the present embodiment, when the trail simulation image is generated, the first simulation image, the black image for the NR, and the second simulation image are shot in this order. As a result, a high-quality trail simulation image can be generated without increasing the generation time of the trail simulation image by the time necessary for shooting of the black image for the NR, as compared with the case in which the black image for the NR is shot before or after the two simulation images are shot. Therefore, the user can easily shoot a starry sky image of a desired composition, on the basis of the generated trail simulation image.

It should be noted that the present invention is not limited to the image pickup apparatus such as the digital camera and can be applied to various electronic apparatuses, such as a portal communication terminal such as a smart phone having a shooting function by the image pickup device, a portal computer such as a tablet PC, and a portal game machine. In addition, it is not required that the image pickup unit 17, the CPU 11, and the image processing circuit 18 are disposed in one casing, like the image pickup apparatus 10. That is, the image pickup apparatus according to the present invention may be configured by configuring the image pickup unit 17 and an image processing apparatus (image processing apparatus (mainly executes an image process and an operation control of the image pickup unit 17) having a configuration in which the image pickup unit 17 is removed from the image pickup apparatus 10) to perform wired or wireless communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-051208, filed Mar. 15, 2016 which is hereby incorporated by reference herein in its entirety.

What is claimed is:

1. An image pickup apparatus, comprising:
an image sensor configured to shoot -a first image, a black image, and a second image in this order; and
at least, one processor and/or circuit configured to function as each of the following units:
a noise reduction unit configured to execute a process for reducing noise in at least one image of the first image and the second image using the black image:
a trail generation unit configured to generate a predicted trail of an object, on the basis of a movement of the object between the first image and the second image:
a synthesis unit configured to synthesize the first image or the second image in which the noise has been reduced by said noise reduction unit and the trail generated by said trail generation unit and generate a trail simulation image of the object: and
a display unit configured to display the trail simulation image synthesized by the synthesis unit,
wherein said trail generation unit detects an area of the object, average luminance of the object, and a color of the object, and
said synthesis unit draws the trail of the object in the trail simulation image by a line and adjusts a property of the line according to at least one of the area of the object, the average luminance of the object, and the color of the object.

2. The image pickup apparatus according to claim 1, wherein said at least one processor and/or circuit is further configured to function as a setting unit configured to set a shooting time to acquire the trail of the object,
wherein said trail generation unit acquires the predicted trail of the object by calculating movement a prediction point of the object until the shooting time.

3. The image pickup apparatus according to claim 1, wherein the object is a star.

4. The image pickup apparatus according to claim 3, wherein said trail generation unit detects a foreground region from the first image or the second image, and
said synthesis unit does not synthesize the foreground region with the trail generated by said trail generation unit.

5. The image pickup apparatus according to claim 1, wherein said noise reduction unit executes a process for reducing noise in each of the first image and the second image, using the black image, and
said trail generation unit detects the object from the first image and the second image in which the noise has been reduced by said noise reduction unit.

6. A control method for an image pickup apparatus, comprising:
a step of shooting a first image a black image, and a second image in this order by image sensor;
a step of executing, by at least one processor and/or circuit, a process for reducing noise in at least one image of the first image and the second image, using the black image;
a step of generating, by said at least one processor and/or circuit, a predicted trail of an object, on the basis of a movement of the object between the first image and the second image;
a step of synthesizing, by said at least one processor and/or circuit, a trail simulation image of the object from the first image or the second image on which the process for reducing the noise has been executed and the predicted trail of the object; and
a step of displaying the trail simulation image on a display unit,
wherein said step of generating detects an area of the object, avers e luminance of the object, and a color of the object, and
said step of synthesizing draws the trail of the object in the trail simulation image by a line and adjusts a property of the line according to at least one of the area of the object, the average luminance of the object, and the color of the object.

7. A computer-readable non-transitory storage medium storing a program for causing a computer to execute a control method for an image pickup apparatus that executes an image process for synthesizing a trail simulation image of an objects the computer having at least one processor and/or circuit, the control method comprising:
a step of shooting, a first image, a black image, and a second image sequentially by an image sensor;
a step of executing, by at, least one processor and/or circuit, a process for reducing noise in at least one image of the first image and the second image, using the black image;
a step of generating, by at least one processor and/or circuit, a predicted trail of an object, on the basis of a movement of the object between the first image and the second image;
a step of synthesizing, by at least one processor and/or circuit, a trail simulation image of the object from the first image or the second image on which the process for reducing the noise has been executed and the predicted trail of the object; and
a step of displaying the trail simulation image on a display unit,
wherein said step of generating detects an area of the object, average luminance of the object, and a color of the object, and
said step of synthesizing draws the trail of the object in the trail simulation image by a line and adjusts a property of the line according to at least one of the area of the object, the average luminance of the object, and the color of the object.

* * * * *